US010060205B2

(12) United States Patent
De Stefano et al.

(10) Patent No.: US 10,060,205 B2
(45) Date of Patent: Aug. 28, 2018

(54) ENCAPSULATED POLYMERS AND SELECTIVE ACTIVATION THEREOF

(71) Applicant: M-I L.L.C., Houston, TX (US)

(72) Inventors: Guido De Stefano, Spring, TX (US); Brandi Katherine Price Hoelscher, Houston, TX (US); Steven Young, Cypress, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/387,976

(22) Filed: Dec. 22, 2016

(65) Prior Publication Data

US 2017/0174974 A1    Jun. 22, 2017

Related U.S. Application Data

(60) Provisional application No. 62/270,690, filed on Dec. 22, 2015.

(51) Int. Cl.

| | |
|---|---|
| *E21B 43/22* | (2006.01) |
| *C09K 8/68* | (2006.01) |
| *E21B 21/00* | (2006.01) |
| *C09K 8/035* | (2006.01) |
| *C09K 8/516* | (2006.01) |
| *C09K 8/72* | (2006.01) |
| *C09K 8/92* | (2006.01) |

(52) U.S. Cl.
CPC ............ *E21B 21/003* (2013.01); *C09K 8/035* (2013.01); *C09K 8/516* (2013.01); *C09K 8/72* (2013.01); *C09K 8/92* (2013.01)

(58) Field of Classification Search
CPC .......... C09K 8/805; C09K 8/685; C09K 8/68; C09K 8/80; C09K 8/62; C09K 2208/26; C09K 8/887; E21B 43/267; E21B 43/26; E21B 33/1208; E21B 21/003; E21B 43/12; E21B 33/12; E21B 33/13; E21B 33/138

See application file for complete search history.

(56) References Cited

U.S. PATENT DOCUMENTS

| | | |
|---|---|---|
| 2007/0027245 A1* | 2/2007 | Vaidya ................... C08C 19/00 524/424 |
| 2007/0281870 A1 | 12/2007 | Robb et al. |
| 2012/0000777 A1 | 1/2012 | Garrell et al. |
| 2012/0015852 A1 | 1/2012 | Quintero et al. |
| 2013/0233545 A1* | 9/2013 | Mahoney ................. C09K 8/80 166/280.2 |
| 2014/0090847 A1 | 4/2014 | Liang et al. |

FOREIGN PATENT DOCUMENTS

WO    2012075293 A2    6/2012

OTHER PUBLICATIONS

International Search Report and Written Opinion issued in International Application No. PCT/US2016/068271 dated Apr. 10, 2017 (10 pages).

* cited by examiner

*Primary Examiner* — Zakiya W Bates
(74) *Attorney, Agent, or Firm* — Osha Liang LLP

(57) ABSTRACT

Wellbore strengthening compositions and methods of use may include a base fluid and a plurality of hydrogel particles or a plurality of core-shell particles suspended in the base fluid. A method of treating a formation may include pumping a wellbore fluid into the formation, where the wellbore fluid includes a base fluid; and a plurality of hydrogel particles or a plurality of core-shell particles suspended in the base fluid.

19 Claims, 19 Drawing Sheets

ENCAPSULATED POLYMERS AND SELECTIVE ACTIVATION THEREOF

CROSS REFERENCE TO RELATED APPLICATIONS

This application claims the benefit of U.S. Provisional Application No. 62/270,690 filed on Dec. 22, 2015, incorporated by reference herein in its entirety.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Wellbore fluids may also be used to provide sufficient hydrostatic pressure in the well to prevent the influx and efflux of formation fluids and wellbore fluids, respectively. When the pore pressure (the pressure in the formation pore space provided by the formation fluids) exceeds the pressure in the open wellbore, the formation fluids tend to flow from the formation into the open wellbore. Therefore, the pressure in the open wellbore is often maintained at a higher pressure than the pore pressure. However, when wellbore pressures are maintained above the pore pressure, the pressure exerted by the wellbore fluids may exceed the fracture resistance of the formation and fractures and induced mud losses may occur. Further, formation fractures may result in the loss of wellbore fluid that decreases the hydrostatic pressure in the wellbore to decrease, which may in turn also allow formation fluids to enter the wellbore. As a result, the formation fracture pressure may define an upper limit for allowable wellbore pressure in an open wellbore while the pore pressure defines a lower limit. Therefore, one constraint on well design and selection of drilling fluids is the balance between varying pore pressures and formation fracture pressures or fracture gradients through the depth of the well.

As stated above, wellbore fluids are circulated downhole to remove rock, as well as deliver agents to combat the variety of issues described above. Fluid compositions may be water- or oil-based and may contain weighting agents, surfactants, proppants, viscosifiers, and fluid loss additives. However, for a wellbore fluid to be effective during wellbore operations, the fluid has to stay in the borehole. During drilling operations, variations in formation composition may lead to undesirable fluid loss events in which substantial amounts of wellbore fluid are lost to the formation through large or small fissures or fractures in the formation or through a highly porous rock matrix surrounding the borehole. While fluid loss is often associated with drilling applications, other fluids may experience fluid loss into the formation including wellbore fluids used in completions, drill-in operations, productions, etc. Lost circulation may occur naturally in formations that are fractured, highly permeable, porous, cavernous, or vugular.

Lost circulation may also result from induced pressure during drilling. Specifically, induced mud losses may occur when the mud weight, required for well control and to maintain a stable wellbore, exceeds the fracture resistance of the formations. A particularly challenging situation arises in depleted reservoirs, in which the drop in pore pressure effectively weakens a wellbore through permeable, potentially hydrocarbon-bearing rock formation, but neighboring or inter-bedded low permeability rocks maintain their pore pressure. This can make the drilling of certain depleted zones impossible because the mud weight needed to support the shale exceeds the fracture resistance of the sands and silts. Another unintentional method by which lost circulation can result is through the inability to remove low and high gravity solids from fluids. Without being able to remove such solids, the fluid density can increase, thereby increasing the hole pressure, and if such hole pressure exceeds the formation fracture pressure, fractures and fluid loss can result.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure are directed to wellbore strengthening compositions that may include a base fluid; and a plurality of hydrogel particles or a plurality of core-shell particles suspended in the base fluid.

In another aspect, methods in accordance with the present disclosure may include pumping a wellbore fluid into the formation, where the wellbore fluid may include a base fluid; and a plurality of hydrogel particles or a plurality of core-shell particles suspended in the base fluid.

Other aspects and advantages of the invention will be apparent from the following description and the appended claims.

DETAILED DESCRIPTION

Figure 1:
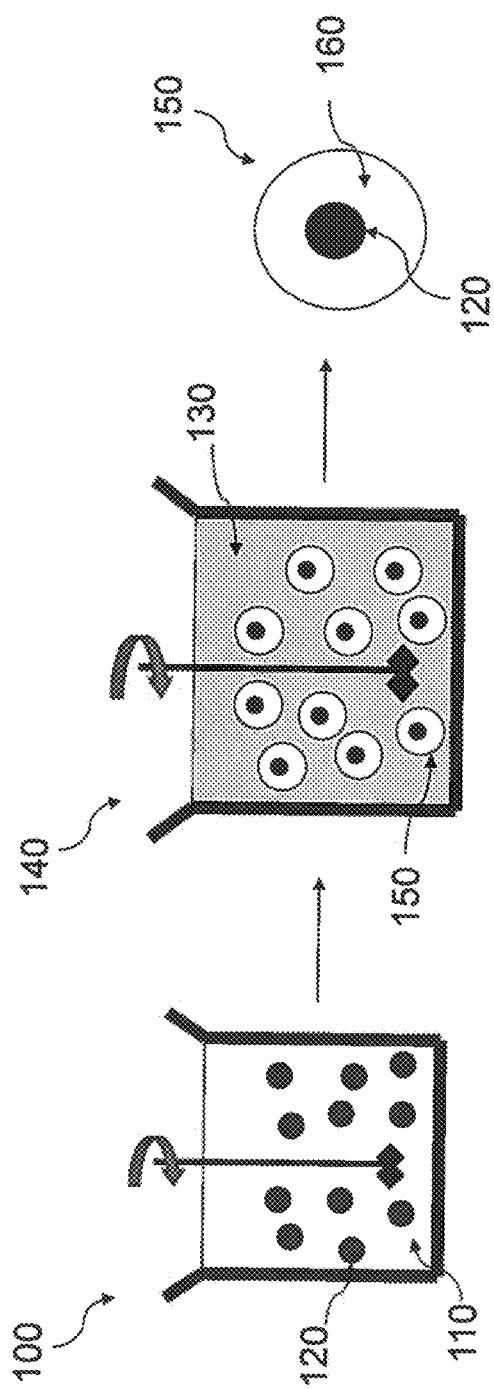
FIG. 1 depicts a mechanism of formation of core-shell particles, in accordance with aspects of the present disclosure.

Generally, embodiments disclosed herein relate to encapsulating polymers present in a wellbore fluid and selective activation thereof. More specifically, embodiments disclosed herein relate to wellbore fluids for downhole applications formed of a base fluid and a plurality of hydrogel particles or a plurality of core-shell particles dispersed or suspended in the base fluid. The inventors of the present disclosure have found that polymers and pre-polymer materials incorporated in encapsulating systems such as hydrogel or core-shell particles may preferentially release encapsulated components under shear conditions generated by pumping the wellbore fluid into a formation through an opening.

According to the present embodiments by encapsulating a material of interest, such as a liquid or a solid suspended or dispersed in a base fluid, within an encapsulating shell (such as a polymer coating) or a polymeric matrix, the encapsulation effectively limits the interaction of the material of interest with other components of the wellbore fluid and allows for in situ release and reaction in the downhole environment. While encapsulated, the material of interest remains dormant in the wellbore fluid. In one or more embodiments, the encapsulated material or materials may be released from an encapsulating shell or a polymeric matrix in response to an external stimulus or triggering event, such as by physical disruption of the encapsulant. Once released, the encapsulated material may react in situ, for example, to form wellbore strengthening materials (such as a lost circulation material), a chemical sealing layer (in/of the filter-cake) or a material that filters into the formation prior to reacting to aid in consolidation of the near-wellbore region of the formation. Additional examples of disrupting the encapsulant to release other encapsulated materials that react in situ include, without limitation, acid generation for stimulation or filter cake cleanup; and oxidizers or anti-oxidants for cementing.

According to the present embodiments, materials that may be encapsulated may be, for example, water soluble materials. The water soluble materials that have shown utility in the present disclosure may be selected from the group of polyether amines (such as Jeffamines, available from Huntsman, the Woodlands, Tx), free water, organic acids (such as, for example, formic acid and acetic acid), mineral acids (sulfuric, boric, hydrochloric, hydrofluoric, etc.), and inorganic salts.

As discussed herein, the entrapment/encapsulation of a material may be performed through different prepartive approaches. These may include for example formation of suspensions, interfacial interactions and mini-emulsions. The preparative approaches that have shown utility in the present disclosure are formation of core-shell particles through a double emulsion approach and formation of hydrogel particles through an invert emulsion approach.

Core-Shell Particles

According to various embodiments, encapsulation of water soluble materials may be performed by means of a two stage emulsification approach, with the formation of a double emulsion. In such embodiments, a first aqueous phase is dispersed in an oleaginous continuous phase with the formation of a primary emulsion. Next, the primary emulsion may be dispersed in a second aqueous phase with the formation of a double emulsion. For example, a double emulsion may be formed by first dispersing water in an oil phase, thereby creating a primary water-in-oil emulsion (or a "single" emulsion) and subsequently dispersing the primary emulsion in excess water with the formation of a water-in-oil-in-water, W/O/W, double emulsion. Thus, a W/O/W double emulsion may include droplets of oil dispersed in an aqueous environment. The oil droplets may form around aqueous droplets (such as water), in which hydrophilic components may be dissolved.

Referring now to FIG. 1, an aqueous soluble material (not shown) is mixed with an aqueous discontinuous phase, such as for example, water, with the formation of a modified aqueous discontinuous phase 120. As described later, the aqueous phase may include other additives, such as a surfactant. Next, the modified aqueous phase may be mixed with an oleaginous continuous phase 110 (such as an oily monomer), with the formation of a primary emulsion 100. Referring still to FIG. 1, the primary emulsion 100 includes droplets 120 of the modified aqueous phase dispersed or emulsed in the oleaginous continuous phase 110. According to various embodiments, the oleaginous continuous phase may include at least a monomer, which upon polymerization may form a polymeric shell or coating in which the water soluble material is encapsulated.

Figure 2:
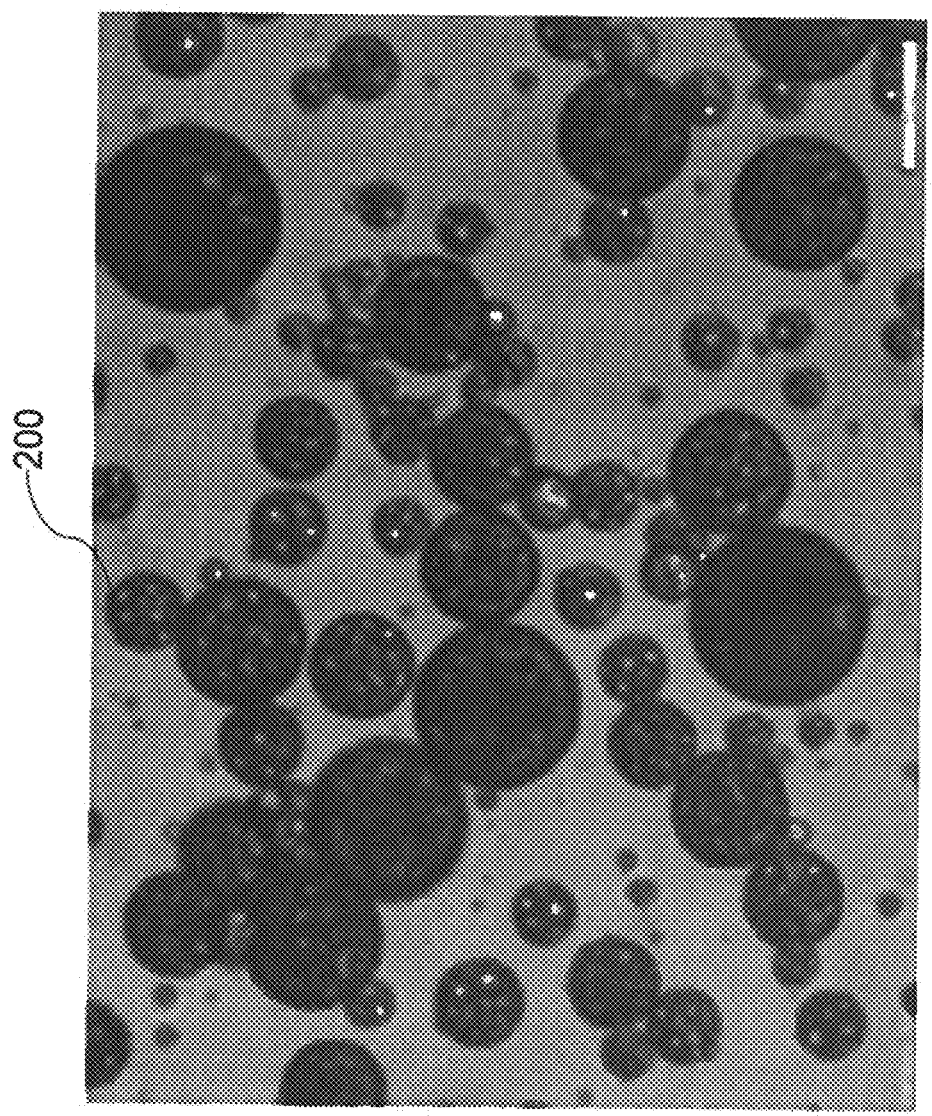
FIG. 2 shows an optical microscopy image of core-shells particles, in accordance with aspects of the present disclosure.

The primary emulsion 100 is mixed with a second aqueous phase 130, with the formation of a double emulsion 140. According to various embodiments, the first and the second aqueous phases may be identical or different. In one or more embodiments, the double emulsion 140 may be prepared by mixing together the primary emulsion 100 and excess water 130 using a high shear mixer. Next, the double emulsion formed as described above is treated by heat, when the monomer present in the oleaginous phase may polymerize with the formation of a polymeric shell or coating around the droplets 120 of the modified aqueous phase. Thus, core-shell particles 150 that are suspended or dispersed into the second aqueous phase 130 may form. In such embodiments, the core 120 of the particles may include droplets of the modified aqueous phase, i.e water and water soluble material, while the shell 160 is a rigid polymer formed by curing the monomer present in the oleaginous phase by heat. In such embodiments, the average particle size of the core-shell particles ranges from about 15 microns, to about 130 microns, where the lower limit may be any of 15 microns, 20 microns, 25 microns, and the upper limit can be any of 115 microns, 125 microns, 130 microns, where any lower limit can be used with any upper limit. Such a preparative approach is easy and fast as the synthesis part does not take a long period of time. However, it may generate larger, multi-core particles, as seen in FIG. 2. Referring now to FIG. 2, FIG. 2 shows an optical microscopy image of core-shell particles having acrylate shells and aqueous cores of salt solutions. As seen in FIG. 2, the core-shell particles 200 have multiple core phases within the particle.

The monomers that may be used to form the core-shell particles, for example, may be selected from the group of acrylates and acrylate derivatives. For example, in various embodiments, the polymers may be selected from the group of pentaerythritol tetraacrylate (I), triethylene glycol dimethacrylate (II), cyclohexyl acrylate (III), allyl methacrylate (IV), 1,6 hexanediol diacrylate, HDDA, (V), 1,1,1-trimethylolpropane triacrylate (TMPTA) (VI), 1,6- hexanediol dimethacrylate, HDDMA, (VII), whose chemical structures are shown below.

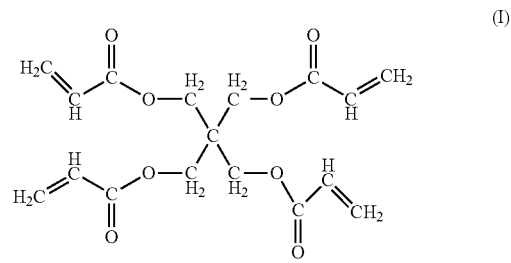

(I)

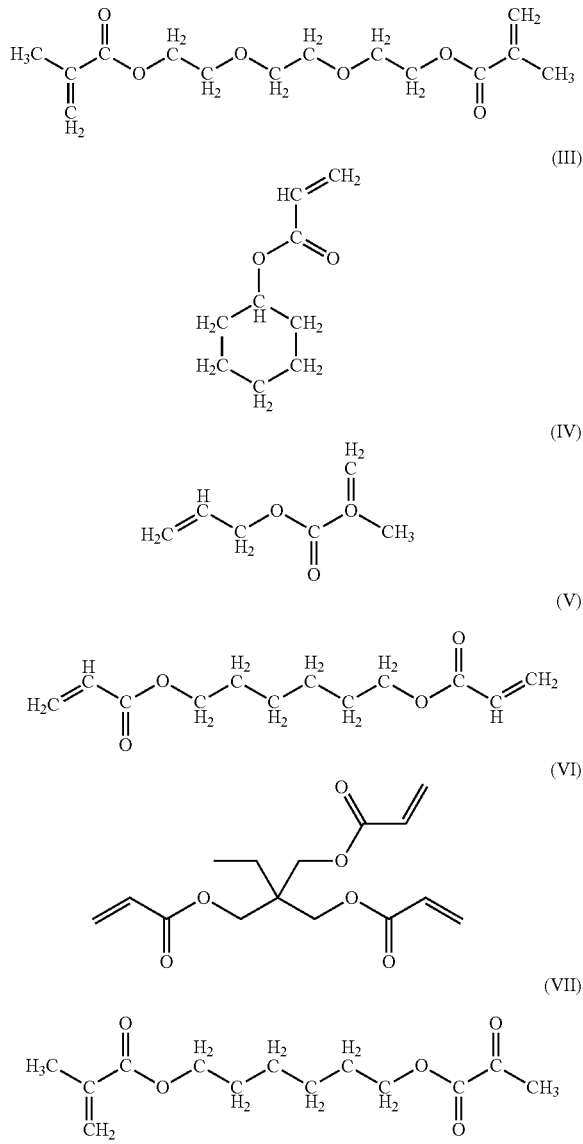

As it will described later, in embodiments that use 1,6 hexanediol dimethacrylate (VII) or pentaerythritol tetraacrylate (I), tough polymers may form upon polymerization of the monomer. In various embodiments, the formulations may be so strong that they may not show evidence of shear rupture, even under bazooka testing, due to high durability. It is also envisioned that mixtures of both tough and more flexible monomers may be used that promote breakage and stability, with the formation of co-polymerized shells or coatings. In one or more embodiments, soluble materials may be added to the monomer, when shear dependent rupture may be achieved. For example, in one or more embodiments, hexadecane may be added to a monomer, such as 1,6-hexanediol dimethacrylate. As hexadecane is not crosslinked into the shell material, it may have more mobility than the cured polymer.

Hydrogel Particles

Figure 3:
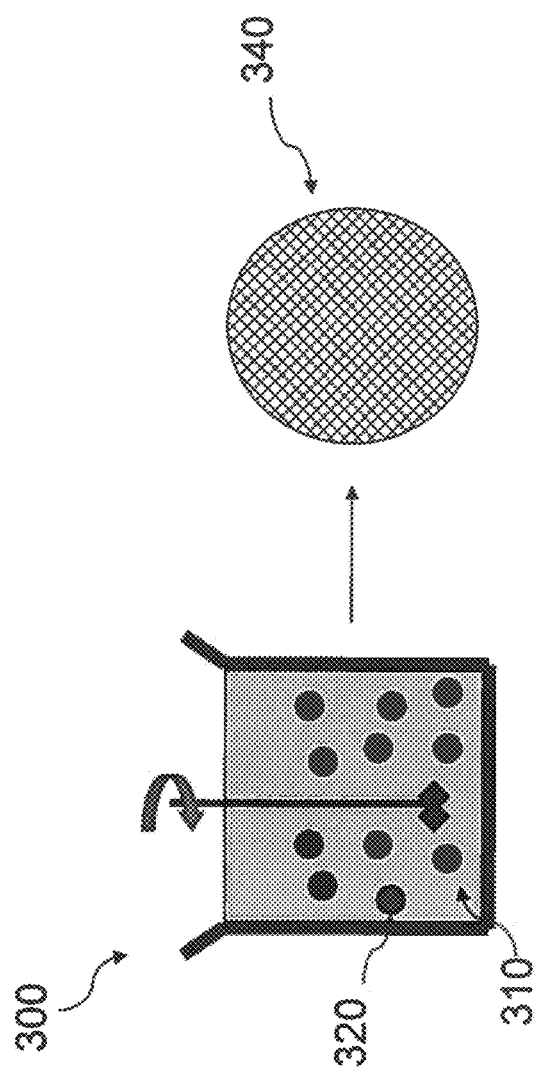
FIG. 3 depicts a mechanism of formation of hydrogel particles, in accordance with aspects of the present disclosure.

It is envisioned that the encapsulation of water soluble materials may also be performed using a different preparative approach, such as a single emulsification process as shown in FIG. 3, with the formation of hydrogel particles. Referring now to FIG. 3, a water soluble material (not shown) and a water soluble monomer (not shown) are mixed with an aqueous phase, with the formation of a modified non-oleaginous discontinuous phase. Next, the modified aqueous phase may be mixed with an oleaginous continuous phase 310, with the formation of an emulsion 300. Thus, the emulsion may include droplets of modified aqueous phase 320 dispersed in an oleaginous environment 310, i.e., the droplets 320 may include water, a water soluble monomer and a water soluble material of interest. Next, upon exposure to UV light, the water soluble monomer incorporated in the droplets 320 may polymerize with the formation of hydrogel particles 340. In such embodiments, the water soluble material of interest is encapsulated into the polymeric matrix of the hydrogels. According to various embodiments, the monomers used for the preparation of the hydrogels exhibit the following properties: 1) are compatible with the water soluble materials of interest; 2) form polymers that are robust enough to survive moderate shear and temperature; 3) are scalable; 4) they are conform to environmental, health and safety requirements. The monomers that have shown utility in the present disclosure may be selected from the group of water soluble acrylates and acrylate derivatives, such as for example 2-hydroxyethyl acrylate (HEA) (VIII), shown below, and ethylene glycol dimethylacrylate.

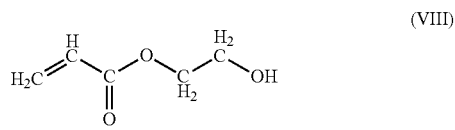

The polymerization of the monomers may be performed using various polymerization methods. One polymerization method that has shown utility in the present disclosure is a UV initiated radical chain polymerization (photoinitiation) that exhibits the benefits of being rapid, relatively low cost (both in materials and amount of initiator needed) and may form robust polymers (high conversion monomer to polymer). For example, upon curing by UV light, ethylene glycol dimethylacrylate forms polyethylene glycol (600) dimethylacrylate whose chemical structure (IX) is shown below.

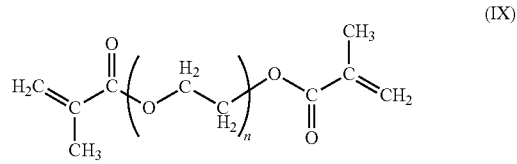

The mechanism of UV initiated radical chain polymerization is presented below. As seen below, a photoinitiator is irradiated using UV light with the formation of radicals (1) which upon initiation (2) and further through propagation (3) and termination (4) stages generate the desired polymeric matrix.

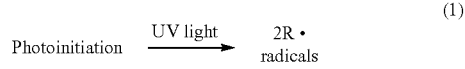

-continued $$R\cdot \;+\; \underset{O}{\overset{OR}{\diagup\!\!\!\diagup}} \xrightarrow{\text{initiation}} \underset{R\text{---}\cdot}{\overset{OR}{\diagup\!\!\diagdown_{O}}} \quad (2)$$

$$\underset{R}{RO\diagdown\!\!\overset{O}{\diagup}\cdot} \;+\; \underset{O}{\overset{OR}{\diagup\!\!\!\diagup}} \xrightarrow{\text{Propagation}} \underset{R}{RO\diagdown\!\!\overset{O}{\diagup}\diagdown\!\!\overset{OR}{\diagup\!\!\diagdown_{O}}} \quad (3)$$

$$\underset{R}{RO\diagdown\!\!\overset{O}{\diagup}\diagdown\!\!\overset{OR}{\diagup\!\!\diagdown_{\cdot\;\;O}}} \xrightarrow[X]{\text{Termination}} \underset{R\;\;X}{RO\diagdown\!\!\overset{O}{\diagup}\diagdown\!\!\overset{OR}{\diagup\!\!\diagdown_{O}}} \quad (4)$$

Figure 4:
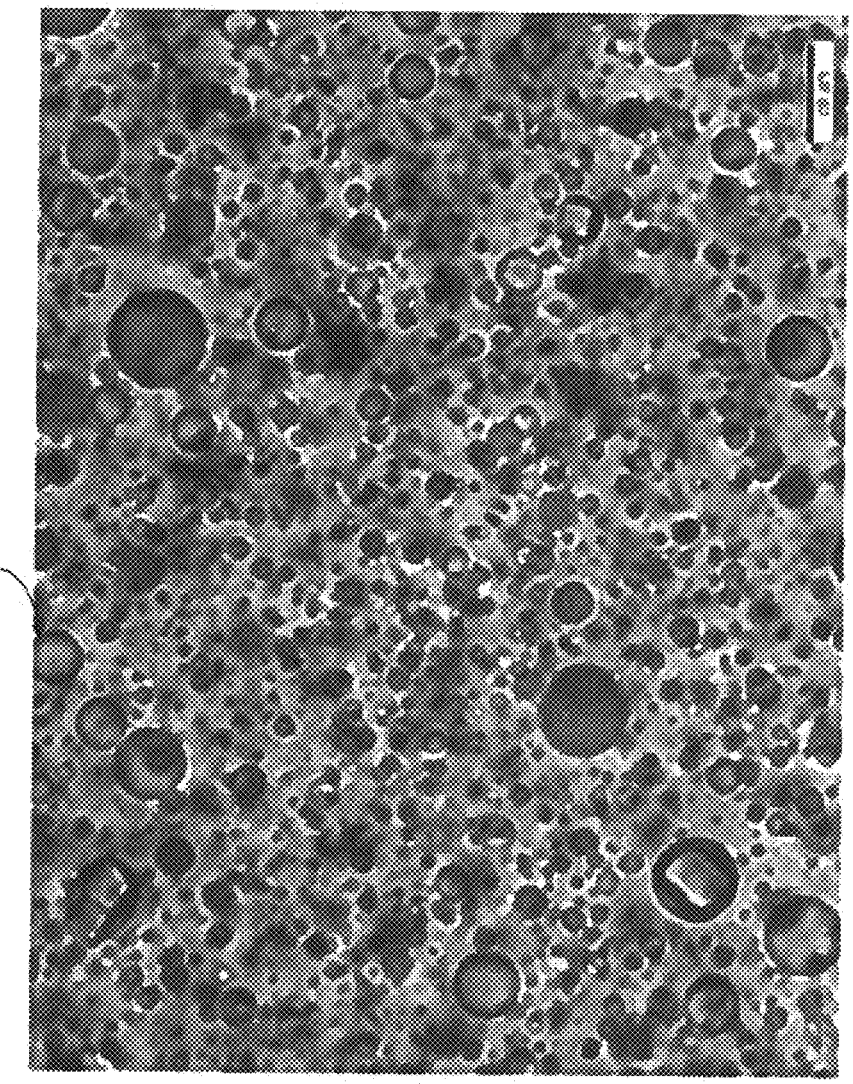
FIGS. 4 and 5 show an optical microscopy image of hydrogel particles, in accordance with aspects of the present disclosure.
Figure 5:
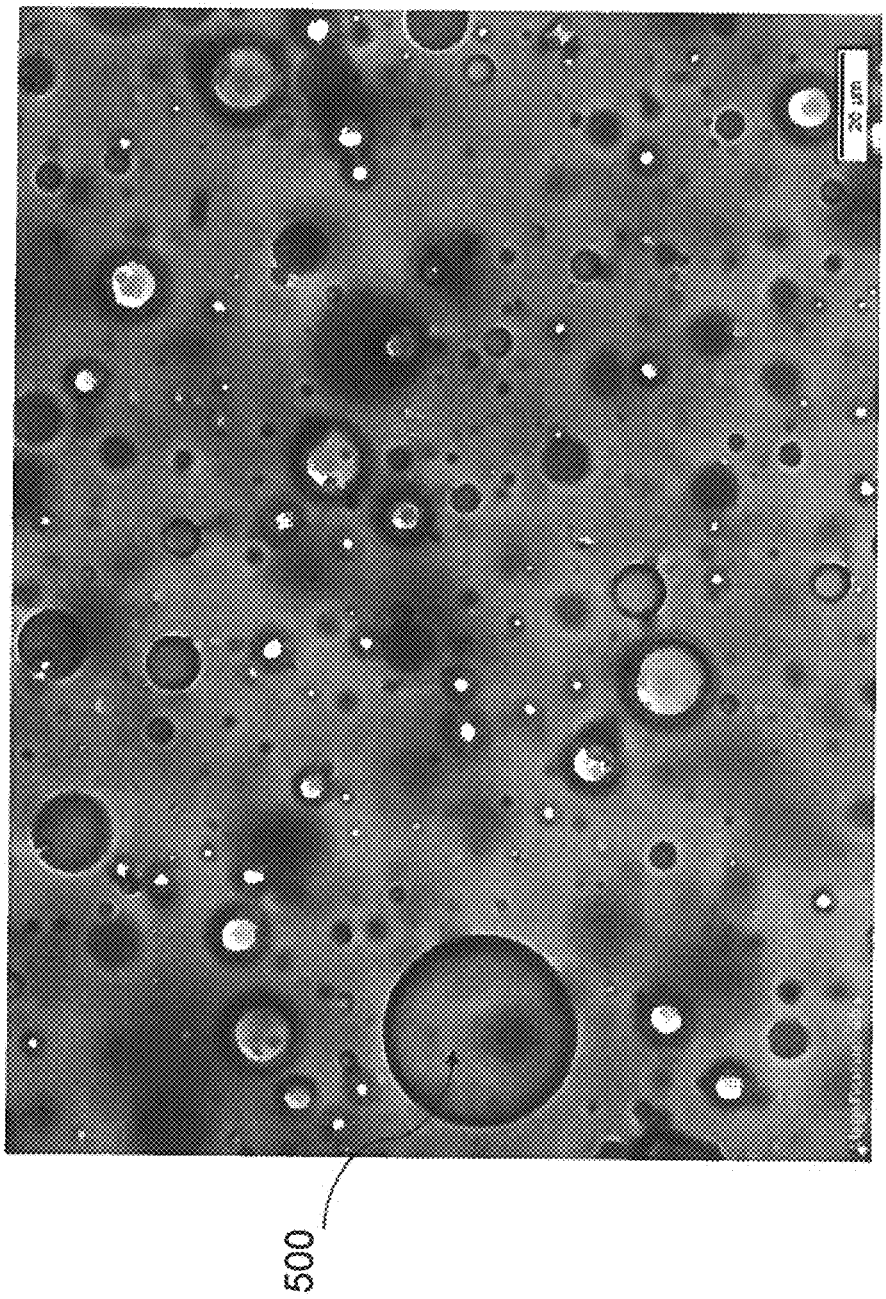
Figure 6:
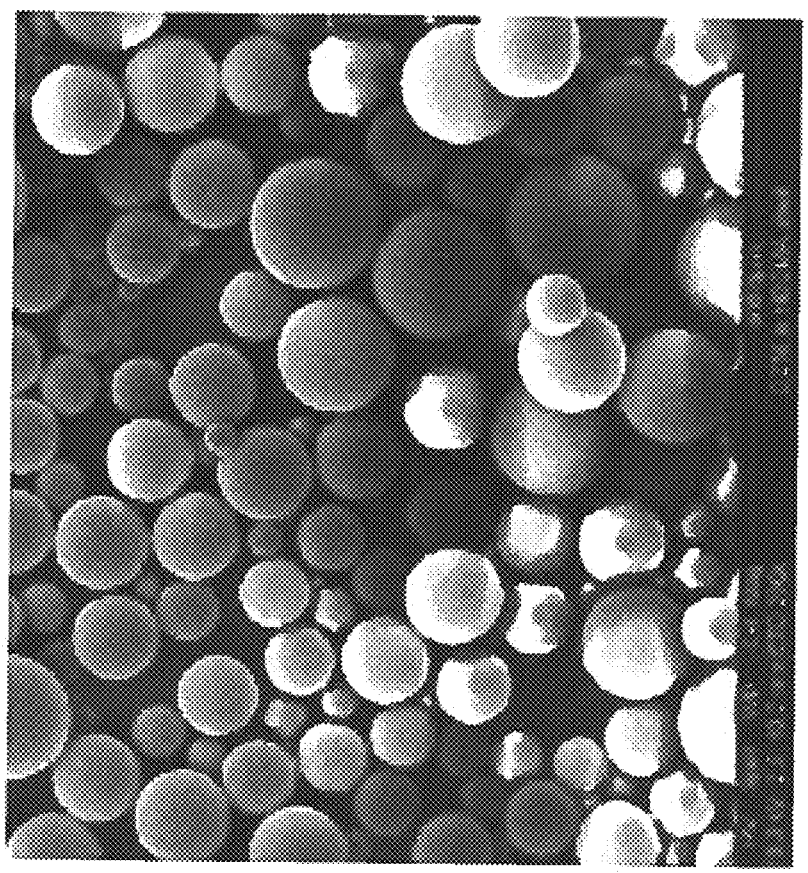
FIGS. 6-14 show SEM images of core-shell particles, in accordance with aspects of the present disclosure.

According to various embodiments, the average particle size of the hydrogel particles ranges from about 15 microns, to about 85 microns, where the lower limit may be any of 15 microns, 20 microns, 25 microns, and the upper limit can be any of 75 microns, 80 microns, 85 microns, where any lower limit can be used with any upper limit. Such a preparative approach is easy and fast. However, it may generate softer gels which may not be fully ruggedized. Referring now to FIGS. 4 and 5, FIGS. 4 and 5 show hydroxyethyl acrylate hydrogel particles 400 (FIG. 4) and 500 (FIG. 5) prepared according to the present embodiments. As seen in FIGS. 4 and 5, the hydrogels may have a wide size selection.

According to the present embodiments, the encapsulated material of interest (such as a water soluble material) may be designed such that the water soluble material may be released when exposed to shear forces such as those that occur during injection of a wellbore fluid downhole. For example, as a wellbore fluid containing a water soluble material encapsulated in a plurality of particles (such as core-shell particles or hydrogel particles) is exposed to shear forces that occur as the fluid exits an opening in a tubular, drill string, or drill bit, the shear forces may disrupt the particles and release the encapsulated material into the surrounding fluid. Thus, the release and delivery of an encapsulated material of interest may be obtained by tuning the shear pressure experienced by the fluid in the wellbore.

Shear forces which are closely related to the pressure drop experienced by a wellbore fluid passing through constrictions in various pumps, pipes, and drill-bits may be sufficient to release the encapsulated component. Without being bound by any theory, the inventors believe that the combination of shear and elongational flow experienced in these conditions may produce enough stress to break the particles, such as core-shell particles or hydrogels that encapsulate the material of interest. Basically, the stress might first come from the turbulence experienced in the pumps of surface equipment and within the wellbore fluid itself. After that, the passage of the flow through a restriction creates first some sort of "Venturi effect" with an acceleration of the wellbore fluid which may have the effect of deforming the encapsulant and then at the outlet of the restriction another deformation of the encapsulant coming from the wellbore fluid deceleration. Velocity increases and decreases are of the order of 50 to 100 times variation. Strain rates experienced in restriction are from 1000 to one million reciprocal second, more specifically 10000 to 200000 reciprocal second. The inventors have noticed that even if the stress experienced during pumping and along the transportation has an effect on the breakage of the encapsulant, the stress and/or velocity difference which is obtained due to the flow through a restriction may be of paramount importance. The stress is closely related to the pressure drop encompassed in each unit of the well treatment (pumps, pipes, drill-bit). A higher pressure drop corresponds to a higher stress applied. The highest stress is observed when the fluid passes through the nozzles in a drill bit or a port of the completion string downhole. By stress sufficient to break the encapsulant, it is to be understood in the context of the present disclosure that said sufficient stress is produced by the passage through the nozzles of the drill bit or similar restriction to allow the material of interest to be released from the encapsulant. The pressure drop observed when passing through the nozzles is from about 150 to 5000 psi (10 to 345 bar), more specifically from 300 to 5000 psi (20 to 345 bar), most specifically from 300 to 1000 psi (20 to 69 bar). As shown earlier, the stress may sometimes also be referred to as a velocity difference. While not bound by a particular theory, it is believed that the shear forces activate the points of contact of the encapsulated material of interest, by applying pressure and therefore, breaking them.

In one or more embodiments, the shell of the core-shell particles or the polymeric matrix of the hydrogel particles may be designed such that the shell or the matrix ruptures when exposed to shear forces of at least 10,000 $s^{-1}$ in some embodiments, at least 20,000 $s^{-1}$ in other embodiments, or at least 30,000 $s^{-1}$ in yet other embodiments Such shear forces may be selectively induced through cavitating and structured drill bits to enable control over the rupture of the shell or matrix.

According to the present embodiments, the base fluids described herein may be oil-based fluids, aqueous-based fluids or emulsions thereof. The oleaginous fluid may be a liquid and more specifically is a natural, mineral or synthetic oil. In some embodiments, the oleaginous fluid may be selected from the group including petroleum oil, a silicone oil, a synthetically derived oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art.

In various embodiments, the aqueous base fluid may generally be any water base fluid phase. In one or more embodiments, the aqueous base fluid may be selected from fresh water, sea water, brines, mixtures of water or brine and water-soluble organic compounds, and mixtures thereof. In those embodiments of the disclosure where the aqueous medium is a brine, the brine may include water and an inorganic salt or an organic salt. The salt may serve to provide a portion of the fluid's density (to balance against the formation pressures), and may also reduce the effect of the water based fluid on hydratable clays and shales encountered during completion. In various embodiments, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic.

In one or more embodiments, the base fluid may be prepared using an invert emulsion where a non-oleaginous discontinuous (or aqueous liquid) phase is emulsed within an oleaginous continuous phase. The preparation of an invert emulsion, such as for example, a water-in-oil (W/O) emulsion, may be done according to the methods and processes known to a person of skill in the art. As noted above, the aqueous discontinuous phase of the emulsion may include one or more materials of interest that may be encapsulated in various particles, such as core-shell particles or hydrogels. In such embodiments, the oleaginous continuous phase and the aqueous discontinuous phase may be selected from any of the liquid phases discussed above. The concentration of the oleaginous fluid should be sufficient so that an invert emulsion forms and may be less than about 99% by volume of the invert emulsion. In one embodiment the amount of oleaginous fluid is from about 30% to about 95% by volume and more specifically about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof. In such embodiments, the amount of the aqueous fluid is less than the theoretical limit needed for forming an invert emulsion. Thus, in one embodiment, the amount of aqueous fluid is less than about 70% by volume, and more specifically from about 1% to about 70% by volume. In another embodiment, the aqueous fluid is from about 5% to about 60% by volume of the invert emulsion fluid.

Upon formation of the encapsulated particles, conventional methods can be used to prepare the wellbore fluids disclosed herein. In one embodiment, a desired quantity of oleaginous fluid such as a base oil and a suitable amount of a surfactant are mixed together and the remaining components are added sequentially with continuous mixing. An invert emulsion may also be formed by vigorously agitating, mixing or shearing the oleaginous fluid and the non-oleaginous fluid.

Upon mixing, the fluids of the present embodiments may be used in wellbore operations, such as in drilling fluids or treatment operations. Such operations are known to persons skilled in the art and involve pumping a wellbore fluid into a wellbore through an earthen formation and performing at least one wellbore operation while the wellbore fluid is in the wellbore.

One embodiment of the present disclosure involves a method of treating a formation. In one such an illustrative embodiment, the method involves pumping a wellbore fluid into the formation. Such a wellbore fluid includes a base fluid and a plurality of hydrogel particles or a plurality of core-shell particles suspended in the base fluid.

Other additives that may be included in the wellbore fluids disclosed herein include for example, wetting agents, organophilic clays, viscosifiers, surfactants, dispersants, interfacial tension reducers, pH buffers, mutual solvents, thinners, thinning agents and cleaning agents. The addition of such agents should be well known to one of ordinary skill in the art of formulating drilling fluids and muds.

It is also envisioned that the wellbore fluids of the present disclosure may include an emulsifier. The emulsifier is a surface acting agent selected from the group of fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above.

Wetting agents that may be suitable for use in the fluids disclosed herein include crude tall oil, oxidized crude tall oil, surfactants, organic phosphate esters, modified imidazolines and amidoamines, alkyl aromatic sulfates and sulfonates, and the like, and combinations or derivatives of these. However, when used with the invert emulsion fluid, the use of fatty acid wetting agents should be minimized so as to not adversely affect the reversibility of the invert emulsion disclosed herein. FAZE-WET™, VERSA-COAT™, SUREWET™, VERSAWET™, and VERSAWET™ NS are examples of commercially available wetting agents manufactured and distributed by M-I L.L.C. that may be used in the fluids disclosed herein. Silwet L-77, L-7001, L-7605, and L-7622 are examples of commercially available surfactants and wetting agents manufactured and distributed by General Electric Company (Wilton, CT).

Organophilic clays, normally amine treated clays, may be useful as viscosifiers and/or emulsion stabilizers in the fluid composition disclosed herein. Other viscosifiers, such as oil soluble polymers, polyamide resins, polycarboxylic acids and soaps can also be used. The amount of viscosifier used in the composition can vary upon the end use of the composition. In one or more embodiments the viscosifier may have a concentration of about 0.1% to about 6% by weight. VG-69™ and VG-PLUS™ are organoclay materials distributed by M-I, L.L.C., Houston, Texas, and VERSA-HRP™ is a polyamide resin material manufactured and distributed by M-I L.L.C., that may be used in the fluids disclosed herein.

EXAMPLES

The following examples are presented to further illustrate the preparation and properties of the wellbore fluids of the present disclosure and should not be construed to limit the scope of the disclosure, unless otherwise expressly indicated in the appended claims.

Example 1

Various particles were prepared using different acrylates, by both double emulsion and one stage emulsion approach, as shown below in Table 1. To assess the appearance of the particles, fluorescent tracers were incorporated into the particles to aid in visualization of encapsulation, particle morphology and release. The shell chemistry refers to the chemical formulae I to IX, referenced and shown above.

TABLE 1

| Shell Chemistry | Density g/mL | Tg (°C.) | Description | Materials used for encapsulation | Particle size (μm) | Observations |
|---|---|---|---|---|---|---|
| Particle formulations | | | | | | |
| Double emulsion | | | | | | |
| I | 1.19 | | Highly cross-linked, brittle polymer | Water, surfactant, Rhodamine B | 75-200 | |
| II | 1.092 | | Flexible | Water, surfactant, colored dyes | | Used in combination with additional monomers |
| III | 0.975 | −5 | Bulky backbone | Water, surfactant, Rhodamine B | 75-120 | |
| IV | 0.938 | | Tough polymer materials | Water, surfactant, Rhodamine B | 50-100 | |
| V | 1.01 | | Quick curing, often used as a diluent for other monomers | Water, colored dyes, fluorescein, Jeffamines, surfactant | 23-100 | |
| VI | 1.06 | ~62 | Trifunctional, brittle, fast curing, forms larger particles | Water, with fluorescein, surfactant | 200-400 | Very large particles, but brittle |
| VII | 0.995 | ~55 | Brittle, fairly rigid | Water with fluorescein, Jeffamines, surfactant | ~100 | Several batches of VII (HDDMA) particles incorporated hexadecane into the shell material |
| Hydrogels | | | | | | |
| VIII | 1.1 | | Soft, flexible gel | 5M NaCl with fluorescein, surfactant | 5-75 | Material agglomerated in transport |
| IX | 1.1 | ~60 | Moderately soft, rubbery polymer | 5M NaCl with fluorescein, surfactant | 25-100 | Material agglomerated in transport |

The hydrogel particles of 2-hydroxyethyl acrylate (VIII) (as shown in FIG. 5) and polyethylene glycol dimethacrylate (IX) (not shown) have a matrix swollen with a solution containing water, surfactant and a fluorescent tracer. Due to the open structure of the polymer matrix, a high ratio of material of interest to polymer was used. The hydrogel particles tend to be sticky and are flexible as the formulations are not ruggedized. Both types of particles were too soft and agglomerated in oil during shipping. In addition, they were difficult to be resuspended.

Example 2

To asses the properties of Jeffamines-based particles various Jeffamines, namely D-230 (X), T-403 (XI) and XTJ-504 (XII), were used as shown below in Table 2. The chemical structures of the Jeffamines used are presented below. Specifically, the Jeffamines were mixed 50% w/w with deionized water prior to encapsulation. The shell material used for these formulations was 1,6-hexanediol dimethacrylate, HDDA (V). The encapsulation was performed via a WOW (water-in-oil-in-water) emulsion due to the high solubility of Jeffamines in water. The core solution includes Jeffamine 50% w/w with deionized water and fluorescein.

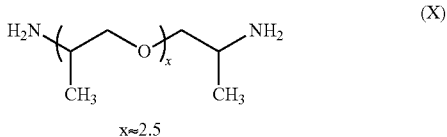
(X)

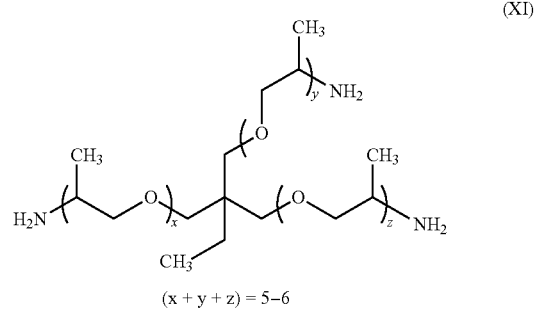
(XI)

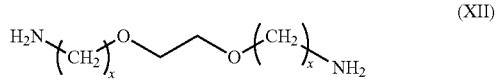
(XII)

TABLE 2

Formulations including various Jeffamines

| Material of interest | pH | MW |
|---|---|---|
| D-230 (X) | 12 | 230 |
| T-403 (XI) | 12 | 440 |
| XTJ-504 (XII) | 13 | 148 |

Figure 7:
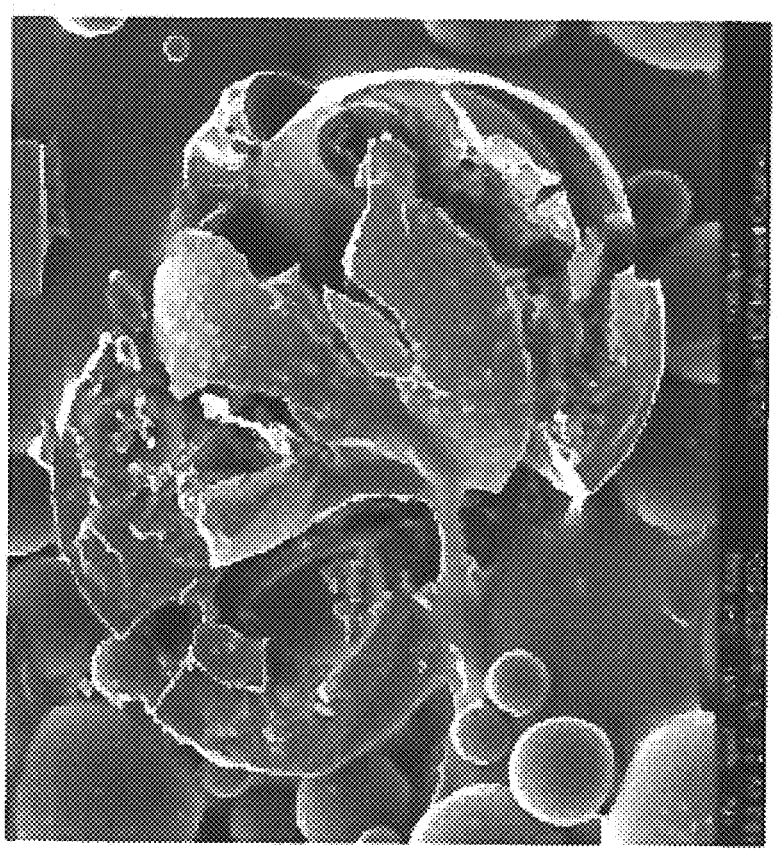
Figure 8:
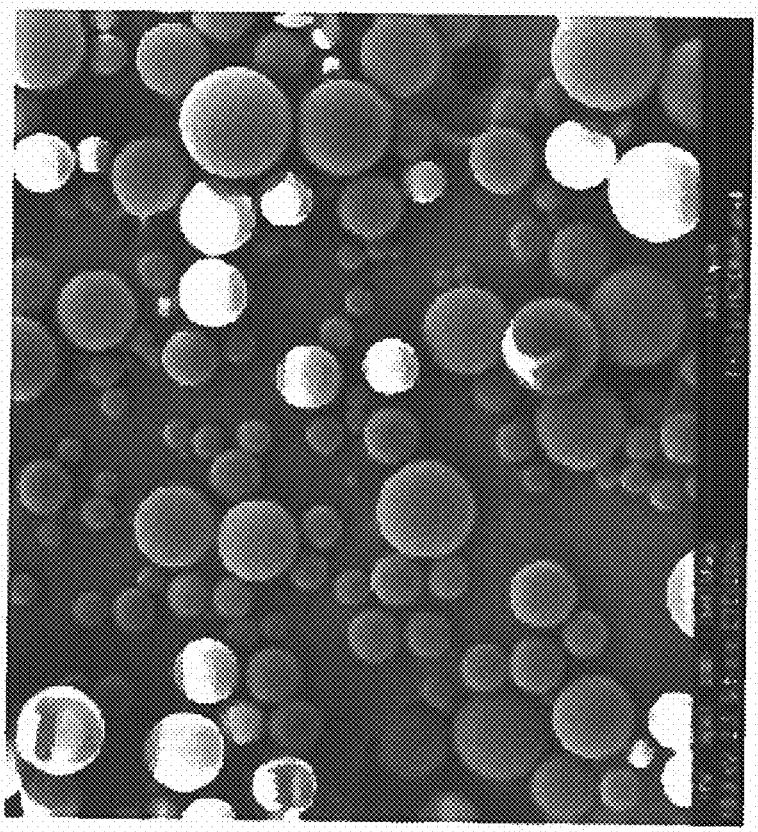
Figure 9:
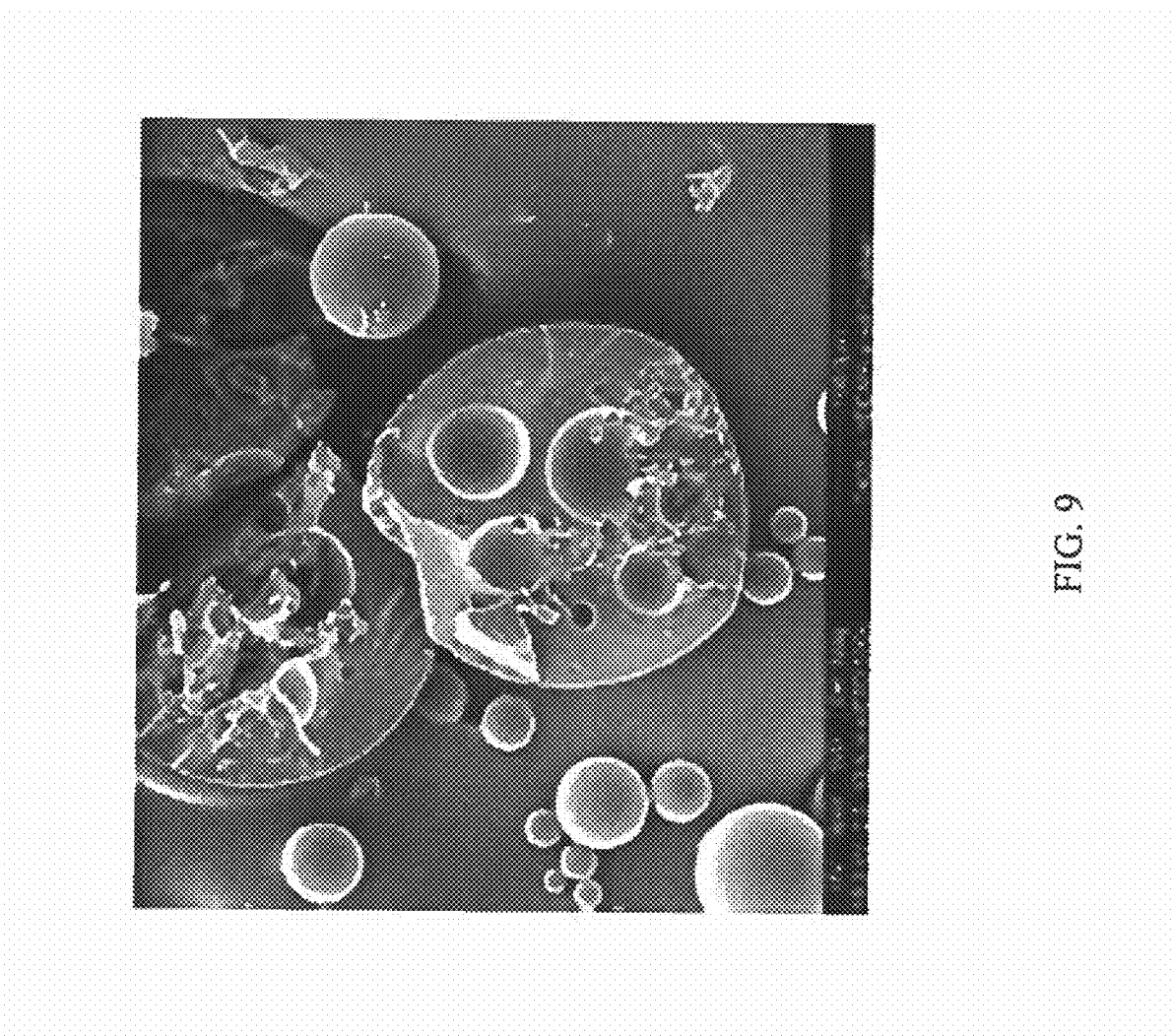
Figure 10:
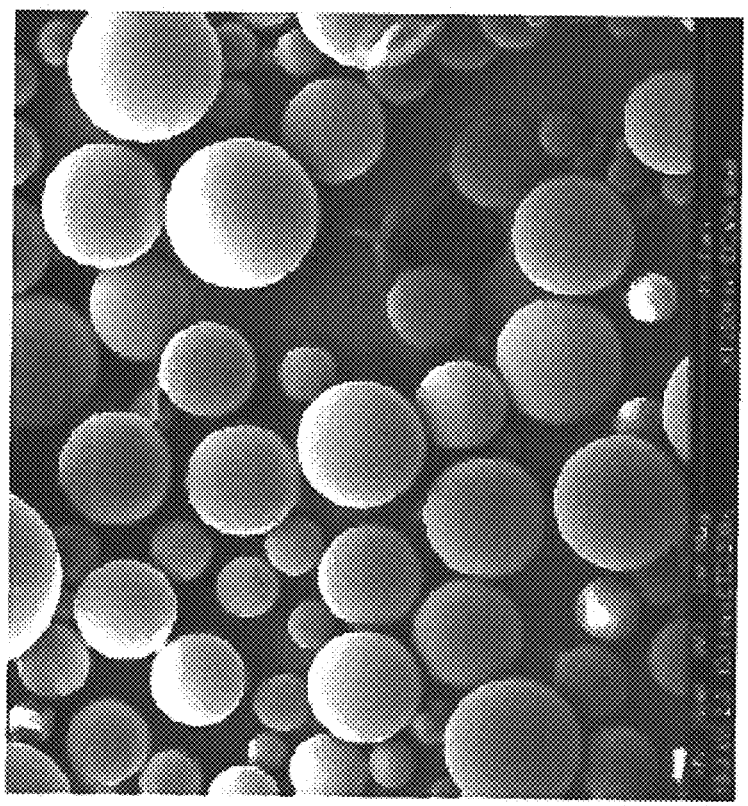
Figure 11:
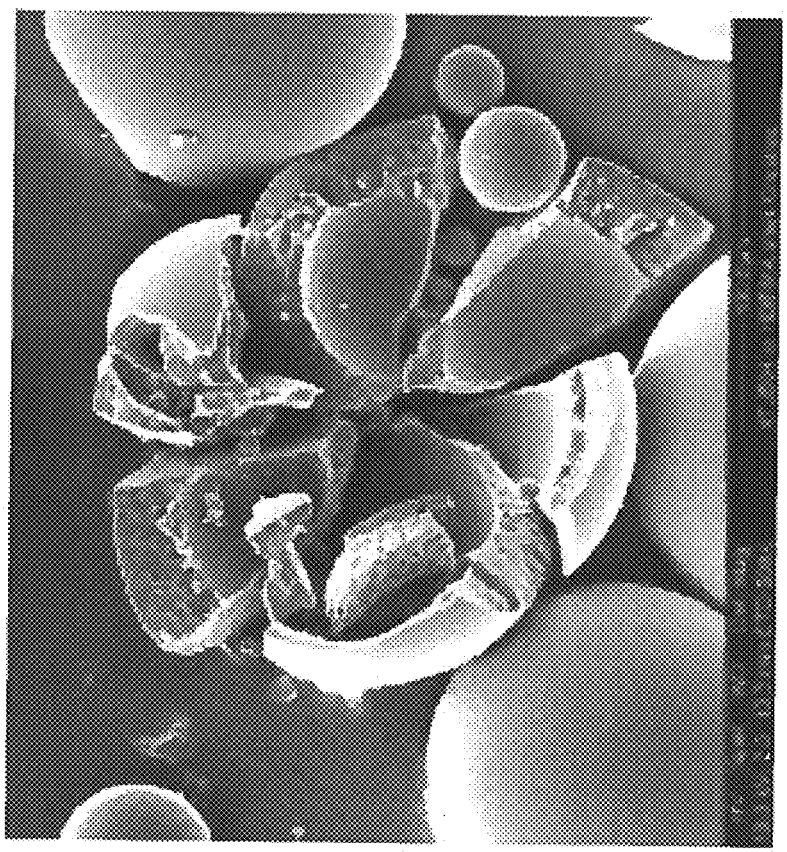

The evaluation (not shown) of the Jeffamine based particles was performed by optical microscopy in the presence of fluorescein. It was round that the resulting Jeffamine-based particles exhibit single and multi-cores. In addition, some of the particles appeared to be fully fluorescent (not shown) (no distinction between core and shell), which is a common artifact when imaging fluorescent materials. To fully assess the appearance of the Jeffamine-based particles, Scanning Electron Microscopy (SEM) was performed before and after manually crushing the samples to enable visualization of the interior. Referring now to FIGS. 6-11, FIGS. 6 and 7 show the particles resulted using D-230 Jeffamine (X) before (FIG. 6) and after crushing (FIG. 7), FIGS. 8 and 9 show the particles including T-403 Jeffamine (XI) before (FIG. 8) and after crushing (FIG. 9), and FIGS. 10 and 11 show the particles including XTJ-504 Jeffamine (XII) before (FIG. 10) and after crushing (FIG. 11). According to the SEM analysis, the particles shown in FIGS. 6-11 have a diameter ranging from about 25 microns to about 100 microns. As seen in FIGS. 7, 9 and 11, the shell thickness varies across samples, but each appeared to be multi-core which may be favored by a high ratio of shell material to core material. The thickness of the shell may depend on the type of material of interest to be encapsulated, as well as on the likelihood of escaping from encapsulant (i.e., protons are small in the case the encapsulated material is an acid).

To further study the encapsulation efficiency of the Jeffamine samples, cured HDDA (V) particles with encapsulated Jeffamines were prepared via WOW approach. The formulations used are presented below in Table 3. During the process of generating the particles, some of the Jeffamine material was not encapsulated, which lowered the overall pH of the second water phase, $W_2$. Particles were washed via centrifugation in a deionized water/Tween® 80 solution to aid in resuspension. Tween® 80 solution is a non-ionic viscous liquid available from Sigma-Aldrich. The pH of the solution was modified to neutral after washing and remained neutral for several days.

TABLE 3

Formulations including various Jeffamines

| Material type | Shell | pH of the material | Initial pH of $W_2$ | Final pH of $W_2$ (pre-wash) | Final pH $W_2$ (post-wash) | pH after 4 days |
|---|---|---|---|---|---|---|
| D-230 (X) | V | 12 | 6 | 10 | 6 | 6-7 |
| T-403 (XI) | V | 12 | 6 | 10 | 6 | — |
| XTJ-504 (XII) | V | 13 | 6 | 10 | 6-7 | — |

Example 3

Particles including poly (pentaerythritol tetraacrylate) (PETRA) were prepared using a WOW approach. The chemical structure of the monomer used (1) is presented above. Due to its chemical structure, PETRA is a highly-crosslinked polymer and as result, increases the brittleness of the core-shell particles. The resulted particles have aqueous cores that also include Rhodamine B as a fluorescent marker. The appearance of the particles was analyzed by fluorescence microscopy (not shown). The average size of the resulted particles is about 50 microns.

Example 4

Figure 12:
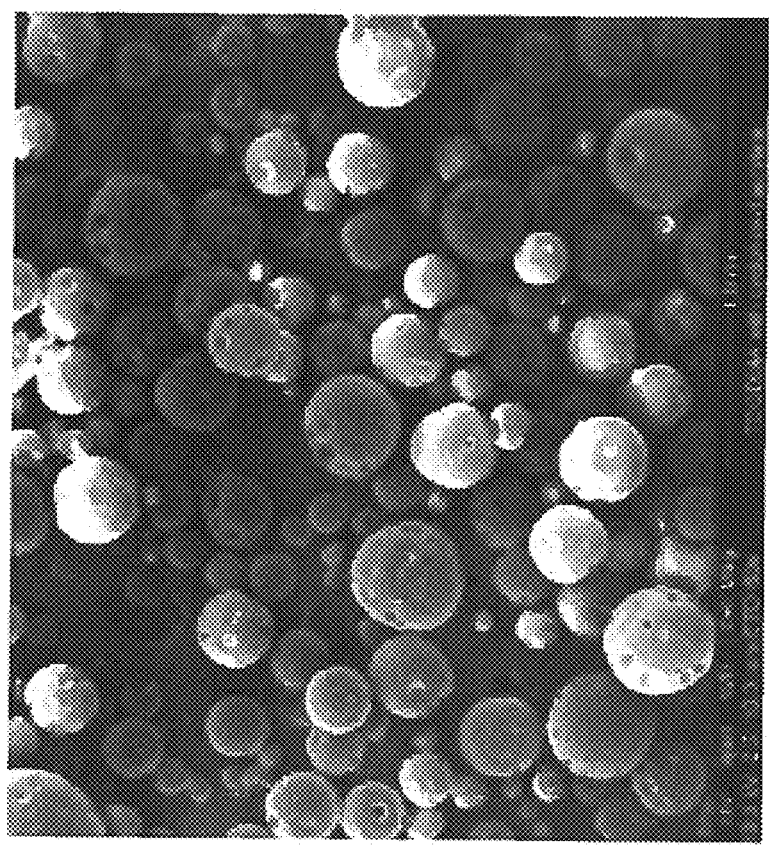
Figure 13:
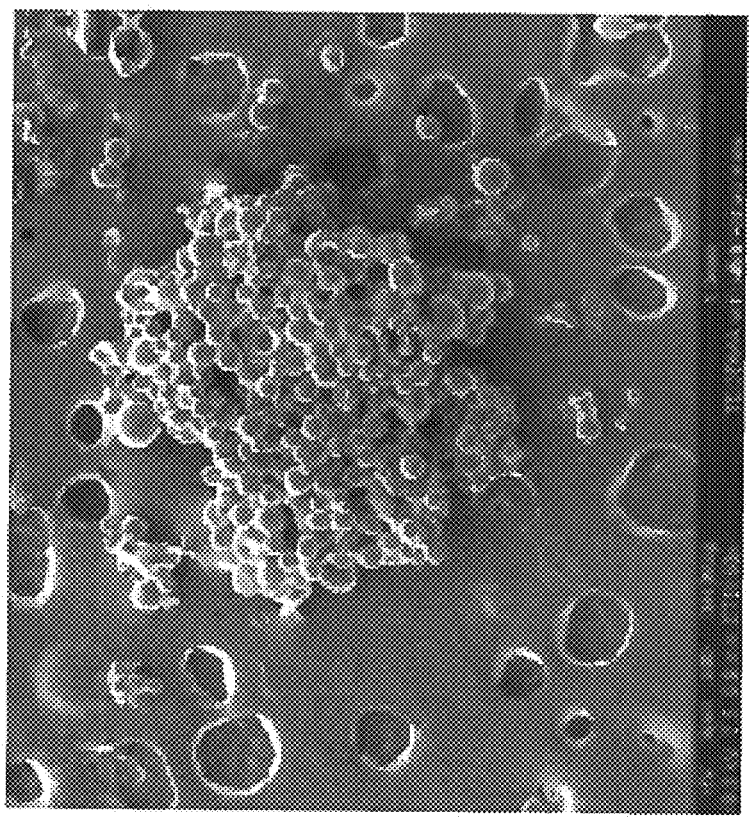

Different polymers were further screened for shear dependent rupture. For example, a water soluble mixture was prepared using surfactant, 1% Tween® 80, 0.2% Pluronic® F127, and Rhodamine B (as a tracer). Such mixture was encapsulated using two different polymer formulations. For example, one formulation included a mixture of cyclohexyl acrylate (III)/triethylene glycol dimethacrylate, TEGDMA (II). A second mixture contained allyl methacrylate (IV)/triethylene glycol dimethacrylate (II). The appearance of the core-shell particles prepared using such formulations was analyzed by SEM. Referring now to FIGS. 12 and 13, FIGS. 12 and 13 show SEM pictures of core-shell particles prepared using the two formulations, (III)/(II) and (IV)/(II), respectively, which were cured through photoinitiation.

Example 5

Figure 14:
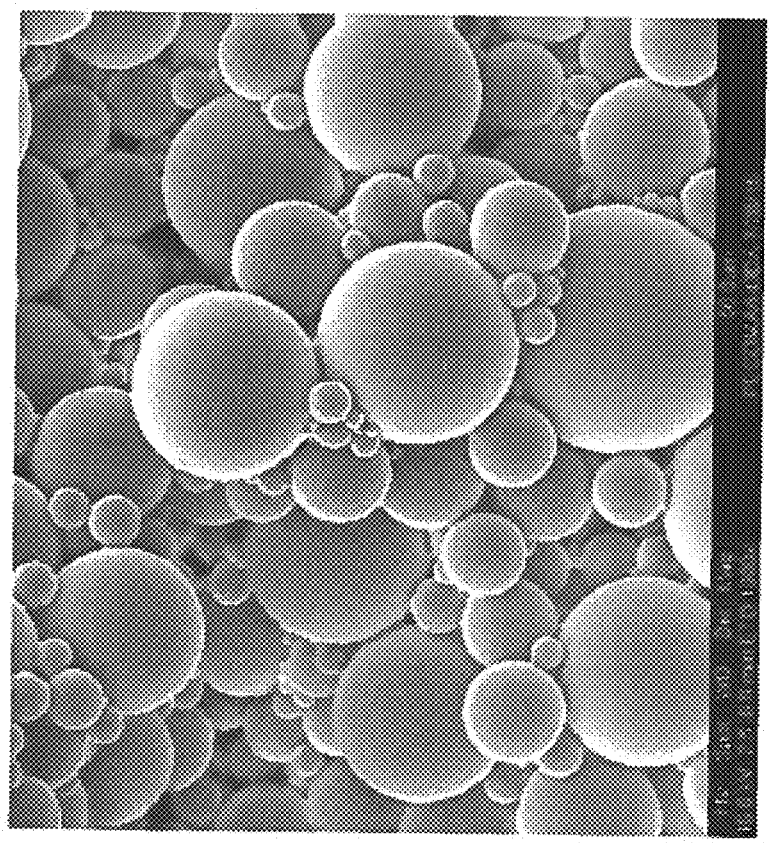

In order to promote breakage and stability, the shell toughness was modified by incorporating co-polymerized samples, such as by incorporating more amorphous areas into the linear hexanediol diacrylate, HDDA (V). Specifically, solid particles such as hydrogels and core-shell particles were both prepared using the same polymer ratios (2:1 HDDA to PEDGMA), where PEDGMA (IX) is polyethylene glycol dimethacrylate ($PEG_{600}DMA$). The solid particles were much larger and polydispersed, but may give an indication of the shell properties, as well as on the formation mechanism. The size of the core-shell panicles was approximately 1 micron. No fluorescence could be detected from core-shell particles due to low intensity likely from small particle size. Without being bound by theory, the inventors of the present disclosure believe that this particle generation mechanism may lead towards a higher percentage of single core particles. Referring now to FIG. 14, FIG. 14 illustrates a SEM picture of hydrogels formed according to the present example. Optical microscopy images (not shown) depict single core hydrogels. It is also envisioned that such particles may be prepared as nano particles and use in treatment methods of the formation, when they are released into the formation. In such an embodiment, the release of the encapsulated material is based on a first release triggered by shear, followed by a second release triggered by temperature or time.

Example 6

To further study shear dependent rupture, oil-soluble materials that are not crosslinked were incorporated into the shell. The use of such materials allows for formation of areas of potentially lower strength in order to promote breakage. For example, hexadecane, $CH_3(CH_2)_{14}CH_3$, was incorporated into 1,6 hexanediol dimethyacrylate (HDDMA) (VII) at 5%, 10% and 25% weight of monomer. The size of the resulted particles ranged from 20 to 125 microns. It was observed that the addition of the hexadecane reduced the polydispersity. Prior to testing, the particles were stored in base oil at 80° C. for 2 hours.

Example 7

To assess the rheological properties of the particles formed, an AR2000EX Rheometer with Environmental Testing Chamber (ETC) was used to study and predict behavior of polymers and materials under different flow, environmental, and processing conditions (temperature, shear rate, etc.). The available geometries (not shown) are concentric cylinder and rotor (shear rates up to 4355 1/sec), parallel plates, cone and plate and Peltier plate. Rheology was measured using a FANN Model 35A Viscometer (bob and sleeve model with a shear rate up to 1022 1/sec) (not shown) having a Fann Yield Stress Adapter (FYSA).

Example 8

For shear testing, an OMNI TH handheld homogenizer capable of speeds up to 35 K rpm was used with low volumes. For such an instrument, the shear rate is dependent on the rotor diameter and the gap between the rotor and stator. Referring now to Table 4, Table 4 shows shear rates for the Omni TH handheld.

TABLE 4

Shear rates for the Omni TH handheld

| Speed (rpm) | 1/sec |
|---|---|
| 5600 | 10 K |
| 8400 | 15 K |
| 11,200 | 20 K |

For mud formulation, two types of blenders were used, namely a Waring blender with a glass cup (capable of speeds up to 23 K rpm) and a Hamiltoon Beach HMD200 mixer (capable of speeds up to 24 K rpm).

Example 9

In order to determine if the ability to observe shear dependent breakage is limited to certain size ranges using the available tools described above, a size dependent breakage study was performed. The study involved core-shells particles with water/Rhodamine B cores and PETRA shells, prepared by WOW approach. The core-shell particles were dispersed in 101618 base oil. The particles were from the same batch to ensure identical shell composition. The particles were binned into three size ranges (small-50 microns, medium-75 microns and large-118 microns) by a centrifuge/settling process.

It was observed that the size range had an impact on the ability to break the particles apart. Larger particles tended to break more easily than smaller particles, with almost no breakage in the very smallest size ranges. Without being bond by theory, the inventors of the present disclosure believe that the limiting factor in this embodiment may be that the handheld homogenizer's rotor/stator gap distance is roughly 220 microns, so anything within that scale will likely be destroyed by mechanical means. Referring now to Table 5, Table 5 shows the experimental data obtained when an Omni handheld homogenizer having a 10 mm probe was used.

TABLE 5

Size dependent breakage study

| Shear device | Time | Shear Rate | Volume | Temperature |
|---|---|---|---|---|
| Omni handheld homogenizer with a 10 mm probe | 2 min | 20 Ks$^{-1}$ | 100 ml base oil | 80° C. for 2 hours |

Example 10

Figure 15:
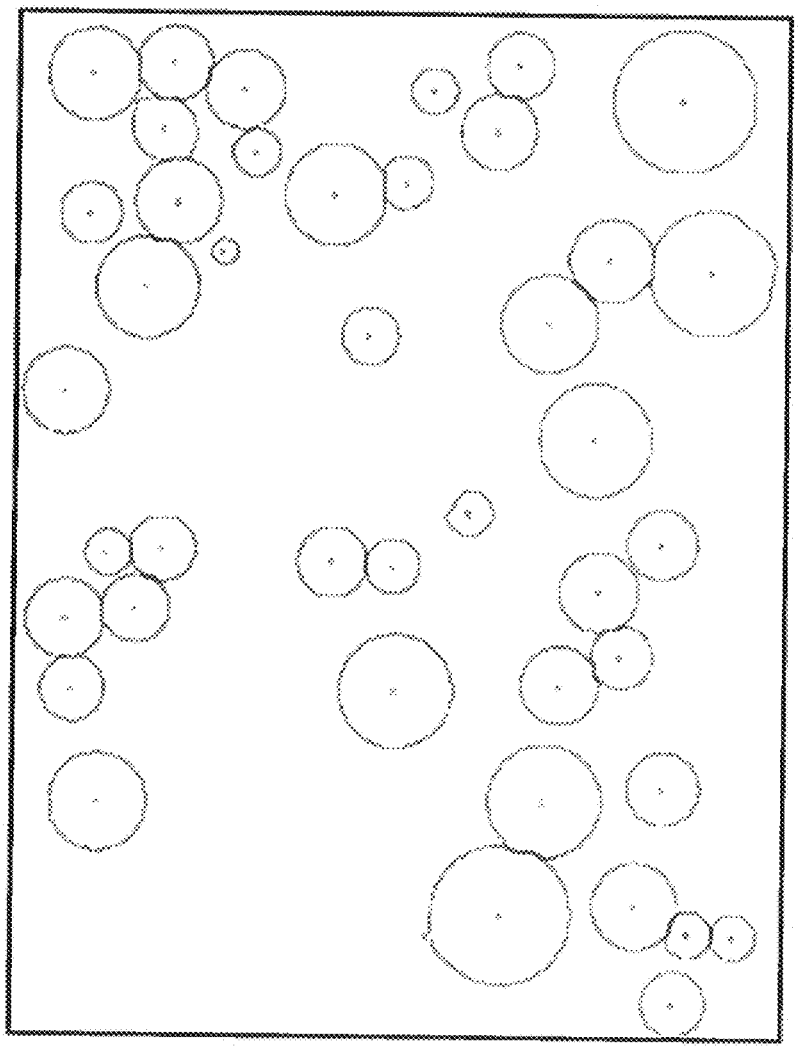
FIG. 15 illustrates the experimental results of the size dependent breakage study, in accordance with aspects of the present disclosure.

To further assess the properties of the particles prepared as disclosed herein, an image particle analysis was performed. Referring now to FIG. 15, FIG. 15 depicts an image particle analysis which was performed by setting the sphericity limits and calculating the area of particles within an image. The experimental data is shown in Table 6 below. The output was particle area calibrated by scale bar in microscopy image.

TABLE 6

Particle area calibrated by scale bar in microscopy image

| Sample no. | Area | | | Diameter |
|---|---|---|---|---|
| 1 | 16420.08 | 5206.11 | 72.15 | 144.31 |
| 2 | 3551.84 | 1126.14 | 33.56 | 67.12 |
| 3 | 1637.30 | 519.12 | 22.78 | 45.57 |
| 4 | 54310.75 | 17219.64 | 131.22 | 262.45 |
| 5 | 2819.50 | 893.95 | 29.90 | 59.80 |
| 6 | 3763.70 | 1193.31 | 34.54 | 69.09 |
| 7 | 3700.93 | 1173.41 | 34.26 | 68.51 |
| 8 | 2296.41 | 728.09 | 26.98 | 53.97 |
| 9 | 4783.74 | 1516.72 | 38.95 | 77.89 |
| 10 | 37673.59 | 11944.70 | 109.29 | 218.58 |
| 11 | 33378.95 | 10583.05 | 102.87 | 205.75 |
| 12 | 13843.82 | 4389.29 | 66.25 | 132.50 |
| Large particles | | | | |
| Large particle average | | | 118.16 | |
| Minimum size | | | 9.26 | |
| Maximum size | | | 339.92 | |

Example 11

In order to evaluate the shearing, optical microscopy images (not shown) were recorded before and alter shearing on fluids containing core-shell particles containing water and blue dye cores and HDDA (V) shells. When an Omni homogenizer having a 10 mm probe was used, the results showed minimal evidence of particle breakage. The majority of the particles remained intact at 8.4 K, 1 min. It was observed that the Waring blender caused some particle aggregation, but the particles remained intact at 15K, 1 min. Table 7 shows the experimental conditions used for optical microscopy studies performed before and after shearing. In the case of using the Omni homogenizer, the approximate shear rate was 15,0000 s$^{-1}$.

TABLE 7

Experimental data used for shearing of core-shell particles with HDDA shells

| Mixer/Shear device | Time | Speed (rpm) | Volume |
|---|---|---|---|
| Waring blender | 30 s, 1 min. | 15 K | 100 ml |
| Hamilton Beach | 30 s, 1 min. | 21 K | 200 ml |
| Omni homogenizer with a 10 mm probe | 30 s, 1 min. | 8.4 K | 20 ml |

Example 12

Figure 16:
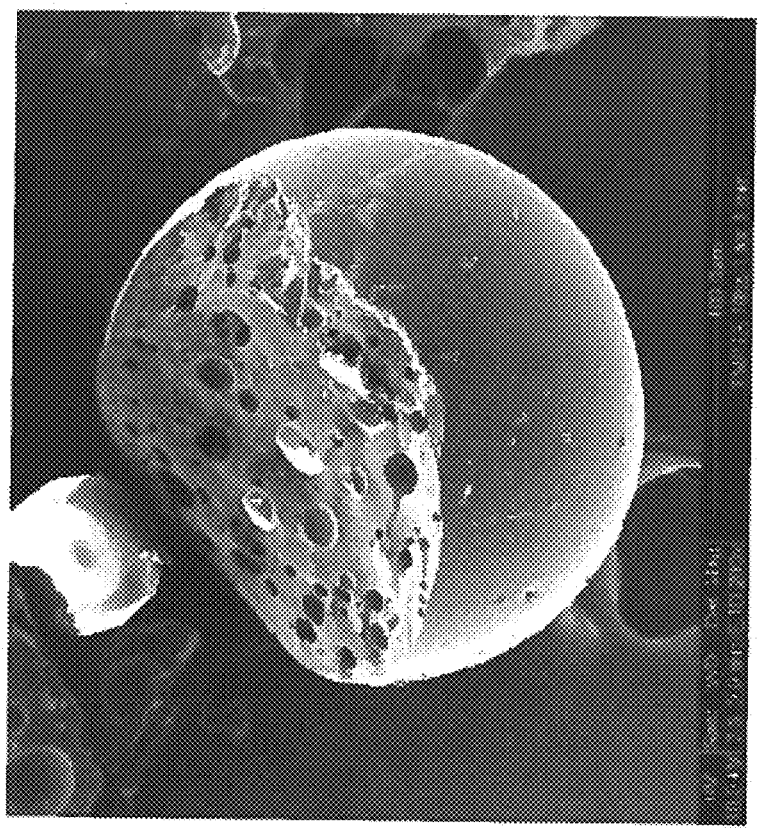
FIGS. 16-18 show SEM images of core-shell particles, in accordance with aspects of the present disclosure.
Figure 17:
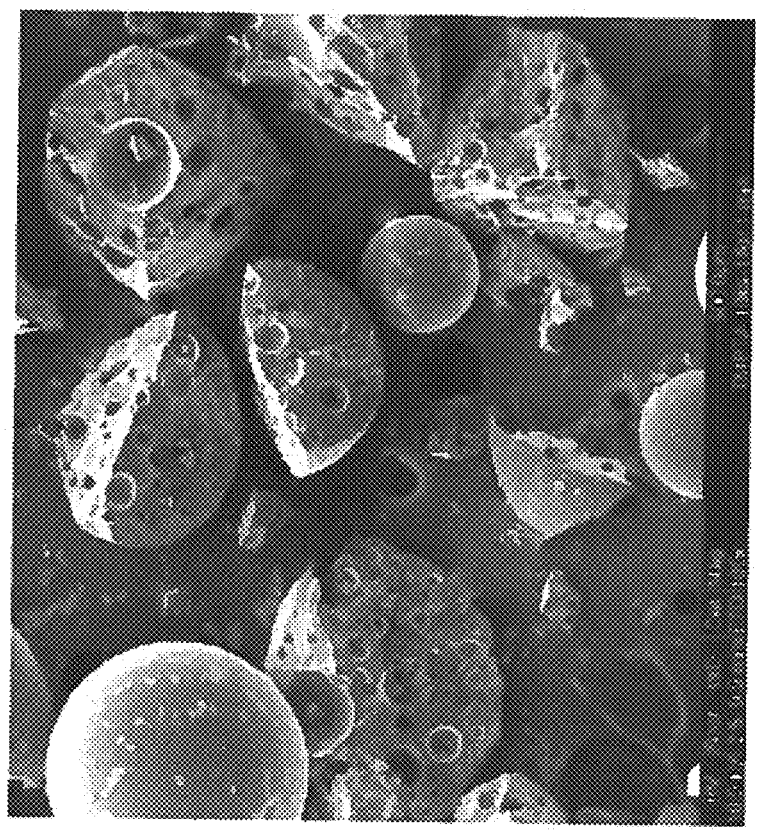
Figure 18:

In order to evaluate the shear of core-shell particles having TMPTA (VI) shells, an Omni homogenizer with a 10 mm probe was used for large, multi-core particles having deionized water cores and TMPTA shells. The shearing was performed in base oil (IO1618). It was observed that breakage occurred in chunks of particle and did not result in the complete destruction of the particle shell. Without being bond by the theory, the inventors of the present disclosure believe that the breakage profile may be a result of the high shell to core ratio. Referring now to FIGS. 16-18, FIGS. 16-18 show SEM images of particles with TMPTA shells which were broken by using an Omni homogenizer having a 10 mm probe. The volume of the solution was 20 ml, and the shearing was performed for 1 min at a shear rate of 10 K/s.

Example 13

Particles containing HDDMA/hexadecane shells prepared by using the WOW approach were stored at 80° C. for 2 hours. The particles were prepared using 5%, 10% and 25% hexadecane. The particles had an average size of approximately 100 microns or less. Shearing was performed at 20 K/s for 2 min. Optical microscopy images (not shown) taken before and after shear indicate that particles showed more signs of breakage over HDDMA (VII) alone (fractured pieces, particle remnants). Thus, the study indicated breakage upon shearing, despite the fact that these particles are in the medium size range which may not demonstrate breaking under size dependent shear testing.

Figure 19:
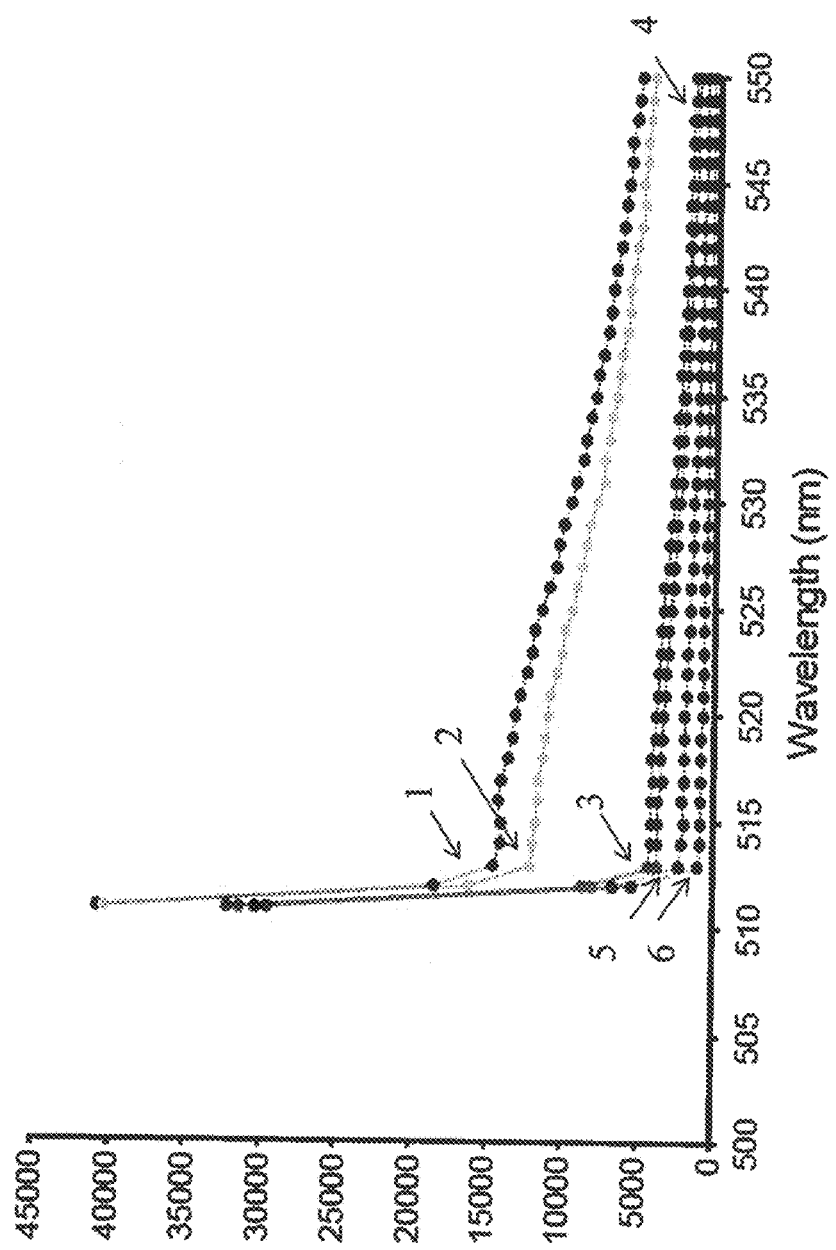
FIG. 19 illustrates UV-Vis experimental data, in accordance with aspects of the present disclosure.

To further assess the properties of the core-shell particles having HDDMA/hexadecane shells, a release study was performed. Specifically, core-shell particles having HDDMA/hexadecane shells and a water/fluorescein core solution were prepared using HDDMA (VII) with 25% hexadecane by a double emulsion WOW approach. The particles were stored in water at room temperature or 80° C. for 2 hours prior to testing. After shear, particles were centrifuged to leave behind a solution or released fluorescein, which was analyzed via UV-Vis spectroscopy. Referring now to FIG. 19, FIG. 19 shows the UV-Vis experimental findings in the presence or absence of shearing. The fluorescein peak emission is located at 511 nm. Table 8 shows the experimental conditions used for the UV-Vis spectroscopy studies.

TABLE 8

Experimental conditions for the UV-Vis spectroscopy studies

| Sample no. | Experimental conditions |
|---|---|
| 1 | 0 hr, room temperature, no shear |
| 2 | 2 hr, room temperature, no shear |
| 3 | 2 hr, room temperature, 10 K/s |
| 4 | 2 hr, room temperature, 20 K/s |
| 5 | 2 hr, 80° C., no shear |
| 6 | 2 hr, 80° C., 20 K/s |

It was observed that there is a major difference between shear at room temperature and shear under heated conditions. For example, the release after 2 hours at 80° C. is much greater than at room temperature (i.e., more than 50% breakage of the shell), where the release is comparative, not quantitative. It was also observed that the fluorescent strength in solution increased with both heat and shear.

Example 13

Stability studies in base oil and brine were performed on two types of core-shell particles. Specifically, the stability of particles having HDDMA/hexadecane (25 wt. %) shells and particles having PETRA was studied. It was observed that the shells of both samples maintained morphology after hot storage for several weeks. In case of particles having PETRA shells it was noticed that the particles agglomerated in brine. Fluorescence (not shown) was still visible from both samples after performing the stability testing. Other samples were tested in brine containing 25% $CaCl_2$ and base oil (separately) for extended periods of time at 80° C. to monitor stability.

Advantageously, embodiments of the present disclosure provide wellbore fluids and methods for treating a formation with such fluids that include a base fluid and a plurality of hydrogel particles or a plurality of core-shell particles suspended in the base fluid. The particles suspended in the base fluid may withstand low temperature, low shear profiles and may selectively release encapsulated materials of interest under high temperature and high shear conditions. Additionally, encapsulation of materials of interest in the core-shell particles or hydrogels may improve the drilling efficiency. Another aspect of the present disclosure is that the core-shell particles, as well as the hydrogel particles as described herein exhibit stability over week timescale. Furthermore, the wellbore fluids of the present disclosure may provide reduced environmental risks, as the materials used for the preparation of shells are conform with environmental, health and safety requirements.

Although only a few example embodiments have been described in detail above, those skilled in the art will readily appreciate that many modifications are possible in the example embodiments without materially departing from this invention. Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A wellbore fluid comprising:
a base fluid; and
a plurality of hydrogel particles or a plurality of core-shell particles suspended in the base fluid, wherein the plurality of hydrogel particles or the plurality of core-shell particles encapsulate a water soluble material.

2. The wellbore fluid of claim I, wherein the base fluid is an oil-based fluid, aqueous-based fluid or an emulsion thereof.

3. The wellbore fluid of claim 1, wherein the plurality of hydrogel particles or the plurality of core-shell particles are formed from at least a monomer selected from the group of acrylates and acrylate derivatives.

4. The wellbore fluid of claim 3, wherein the plurality of core-shell particles further comprise an organic solvent.

5. The wellbore fluid of claim 4, wherein the organic solvent is hexadecane.

6. The wellbore fluid of claim 3, wherein the plurality of hydrogel particles have an average size ranging from about 15 to about 85 microns.

7. The wellbore fluid of claim 3, wherein the plurality of core-shell particles have an average size ranging from about 15 microns to about 130 microns.

8. The wellbore fluid of claim 1, wherein the water soluble material is selected from the group of polyether amines, free water, organic acids and inorganic salts.

9. The wellbore fluid of claim 1, wherein the encapsulated water soluble material is released by subjecting the plurality of hydrogel particles or the plurality of core-shell particles to shear forces generated by pumping the wellbore fluid into a formation through an opening.

10. A method of treating a formation, the method comprising:
pumping a wellbore fluid into the formation, the wellbore fluid comprising:
a base fluid; and
a plurality of hydrogel particles or a plurality of core-shell particles suspended in the base fluid, wherein the plurality of hydrogel particles or the plurality of core-shell particles encapsulate a water soluble material.

11. The method of claim 10, wherein the base fluid is an oil-based fluid, an aqueous-based fluid or an emulsion thereof.

12. The method of claim 10, wherein the plurality of hydrogel particles or the plurality of core-shell particles are formed from at least a monomer selected from the group of acrylates and acrylate derivatives.

13. The method of claim 12, wherein the plurality of core-shell particles further comprise an organic solvent.

14. The method of claim 13, wherein the organic solvent is hexadecane.

15. The method of claim 12, wherein the water soluble material is selected from the group of polyether amines, free water, organic acids and inorganic salts.

16. The method of claim 12, wherein the plurality of hydrogel particles have an average size ranging from about 15 to about 85 microns.

17. The method of claim 12, wherein the plurality of core-shell particles have an average size ranging from about 15 microns to about 130 microns.

18. The method of claim 12, wherein the encapsulated water soluble material is released by subjecting the plurality of hydrogel particles or the plurality of core-shell particles to shear forces generated by pumping the wellbore fluid into a formation through an opening.

19. The method of claim 18, wherein the shear threes trigger a first release, and a second release is triggered by temperature or time.

* * * * *